United States Patent [19]

Rogora et al.

[11] 4,233,943

[45] Nov. 18, 1980

[54] DEVICE FOR DETECTING PREMATURE IGNITION IN AN INTERNAL-COMBUSTION ENGINE

[75] Inventors: Edoardo Rogora; Giancarlo De Angelis, both of Milan, Italy

[73] Assignee: Alfa Romeo S.p.A., Italy

[21] Appl. No.: 16,620

[22] Filed: Mar. 1, 1979

[30] Foreign Application Priority Data

Mar. 3, 1978 [IT]  Italy ................................ 20888 A/78

[51] Int. Cl.³ .......................... F02P 5/14; G01L 23/22
[52] U.S. Cl. .................................... 123/425; 123/435; 73/35
[58] Field of Search ..................... 123/119 ED, 117 R; 73/35, 116; 324/384, 391; 361/253, 256, 257, 263

[56] References Cited

U.S. PATENT DOCUMENTS

| | | | |
|---|---|---|---|
| 2,141,416 | 12/1938 | Serruys | 73/35 |
| 2,220,558 | 11/1940 | Van Dijck et al. | 123/117 R |
| 2,467,732 | 4/1949 | Davis | 123/119 ED |
| 2,517,976 | 8/1950 | Clarke | 123/119 ED |
| 3,286,164 | 11/1966 | Huff | 73/35 |

*Primary Examiner*—P. S. Lall
*Attorney, Agent, or Firm*—Charles E. Brown

[57] ABSTRACT

A pre-ignition detecting device for an internal-combustion is disclosed, which belongs to the general type of ionization-detectors, but employs no supplementary probe near the spark plug(s).

The device is electronic and comprises a circuitry in which a switching stage is capable of discriminating the signals indicating ionization at the electrodes in the cases in which the contact-breaker is open from those indicating ionization in the opposite case, that is, when pre-ignition occurs. Display devices can visualize the pre-ignition ripples and an operative stage could actuate, if so desired, the advance of ignition control in order to restore the engine to its normal run whenever necessary.

4 Claims, 1 Drawing Figure

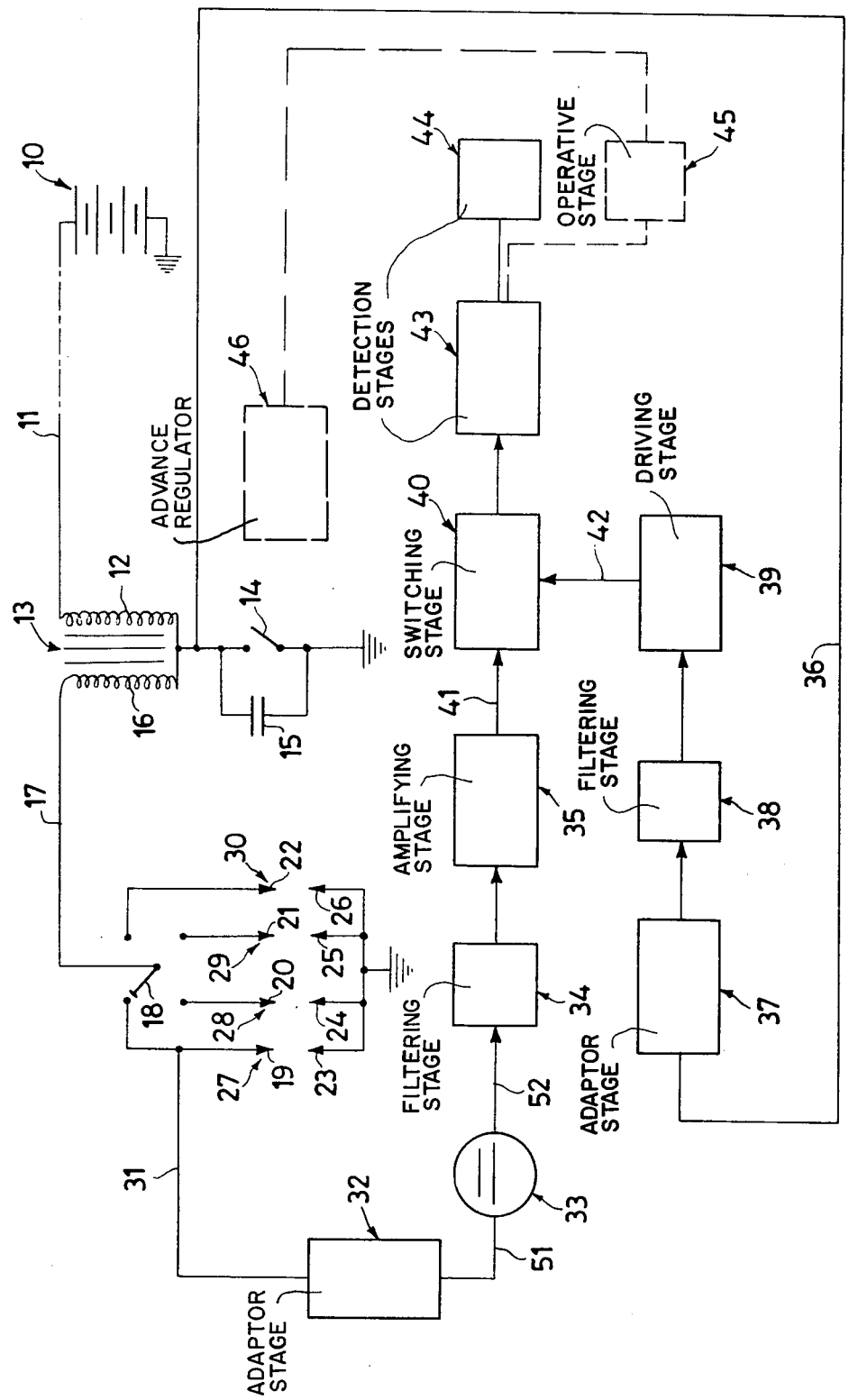

DEVICE FOR DETECTING PREMATURE IGNITION IN AN INTERNAL-COMBUSTION ENGINE

This invention relates to an electronic device which is adapted to detect irregular combustions and more particularly premature ignitions in an internal-combustion engine.

In the explosion chambers of the internal-combustion engines the premature ignition of the mixture of air and petrol may occur independently of the action of the ignition system, due to the presence of hot spots, such as carbonaceous incrustation or superheated areas of the exhaust valves or the sparking plugs: such hot spots prime the ignition of the mixture prior to the sparking between the plug electrodes.

Such spontaneous ignitions are experienced, at the outset, in a discontinuous way, once every different cycles of a cylinder, but, if no action is taken, they tend to become stabilized within a more or less short time unitl they are repeated regularly at every cycle, so that they originate efficiency losses and an irregular run of the engine as they are uncontrolled ignitions which do not follow the correct timing sequence for which the ignition system has been preset and, in certain cases, they even cause serious mechanical damages to the engine.

It becomes thus desirable that a device may become available which is capable to detect, very quickly and accurately, the occurrence of the premature ignition in at least one of the engine cylinders, and which is capable to give a warning signal of such an irregular engine run.

Devices are already known for detecting the premature ignition and they use as the indicative parameter for such phenomenon the degree of ionization of the mixture. Such devices are based of the fact that an ionization of the mixture is concurrent with the combustion. Thus, when the mixture burns in a combustion chamber, the gas which is present in the sparking plug gap is intensely ionized and exhibits the characters of an electric conduction. Ionization can thus be assumed as an indicative parameter of the premature ignition.

A few devices of the kind referred to above provide for the use of a probe which is mounted on the cylinder together with the sparking plug. Other devices, instead, use the sparking plug as such as the probe, but require that the ignition current be cut off to the plug in order to be able to detect premature ignition in the cyclinder.

With the devices of the former kind a modification of the engine head is required to insert the probe into the combustion chamber, whereas, with the devices of the latter type the readings cannot be very accurate since the test conditions of the cylinder differ from the operative conditions due to the lack of ignitions on the sparking plug and the readings are the less reliable the more cyclically discontinuous the premature ignition trend in the engine is and for the same reason, these devices are poorly responsive to an incipient premature ignition.

An object of the present invention is to provide an electronic device for detecting premature ignitions in an internal combustion engine, of the kind based on the detection of the degree of ionization of the mixture which does not require the use of a probe additional to the sparking plug and does not disturb or modify anyway the normal operation of the ignition system, that is, does not require cutting off the electricity to the sparking plug during the detection of premature ignitions.

The device according to the invention is provided for the ignition system of an engine, comprising circuit means for cyclically commanding the sparking of an electric discharge to each engine plug with an ignition advance timed, i.e. variable as a function of the working conditions of the same engine, said device comprising first means operatively connected to at least one of the engine sparking plugs adapted to generate signals indicating the conditions of conductivity of the sparking plug concerned, that is, of the degree of ionization between the electrodes, said device being characterized in that it comprises second means operatively connected to said circuit means, adapted to detect the operative conditions of the sparking plug and adapted to generate signals indicative of the sparking of the electrical discharge at the plug, said device further comprising switching means operatively connected to said first and second means and adapted to generate signals which are functions of the signals delivered by said first means exclusively when no signals are being generated by said second means.

More particularly, in the device according to the invention, said first means are composed by at least a first circuit for detecting the state of conduction of one of the engine spark plugs, said first circuit comprising a first stage of adaptation for disconnecting same circuit from said circuit means, a generator of medium DC-voltage adapted to deliver current to the plug when the mixture which is present between its electrodes is ionized and takes the character of an electric conductor, a filtering stage adapted to separate from interfering spurious signals the current signals flowing therethrough when said generator is delivering current, an amplification stage for said current signals, the device being characterized in that said second means are composed by a second circuit for detecting the operative state of the spark plug, said second circuit comprising a second stage of adaptation for disconnecting the same circuit from said circuit means and for the shape and level processing of the low-voltage signals which are generated in the same second circuit when sparks are generated between the plug electrodes, a filtering stage adapted to isolate said low-voltage signals from frequency-superposed signals, a driving stage adapted to amplify the signals which are generated in the second circuit, said switching means comprising a switching stage connected to said first and said second circuit, said switching stage being adapted to permit the flow towards its output of the signals generated in the first circuit in the absence of the signals delivered by the second circuit, the presence of said signals at the output of the switching stage indicating ionization of the mixture in the cylinder before the sparking at the plug, thus premature ignition, said switching stage being adapted to cut off the flow of the signals generated in the first circuit in the presence of the signals delivered by the second circuit, that is, in the presence of sparks at the plug, said switching stage being operatively connected to a stage of detection of the signals at the output of the switching stage.

The device according to the invention thus utilizes as the probe the plug in the cylinder being checked: the plug, however, remains always connected to the ignition system and is capable of delivering a spark for the controlled ignition of the mixture, even during the operation of the pre-ignition detecting device. The device is thus very prompt and accurate and capable of detecting also incipient pre-ignitions since it is operative at every cycle of the engine.

A device such as that of this invention has, moreover, the advantage that it is simple enough as to be used on a car so that the pre-ignition signal detected thereby can be exploited as a warning for the car driver in the case of an irregular engine run, or as an adjusting parameter for acting upon the ignition system in order to make the engine operation regular.

Features and advantages of the invention will become more clearly apparent from the scrutiny of the accompanying drawing which shows, by way of example, the block diagram of a preferred embodiment of the invention in question.

In the drawing, at 10 there is indicated a low-voltage storage battery which is connected by the main 11 to the primary winding 12 of an ignition coil, generally indicated at 13. The coil 13 is connected to the ground by a usual contact-breaker, indicated at 14, which is cyclically closed and opened in synchronized sequence with the engine by a lobe cam not shown in the drawing. At 15 a capacitor is indicated, which is connected with contact-breaker in parallel. The secondary winding of the coil 13, indicated at 16, is connected by a lead 17 to the ignition distributor 18 which is sequentially engaged by the contacts of the several spark plugs of the engine, which are four in the example shown and are indicated generally at 27, 28, 29 and 30. The drawing diagrammatically shows at 19, 20, 21 and 22, the high-voltage electrodes of the plugs, the respective mass electrodes being indicated at 23, 24, 25 and 26.

The high-volage electrode 19 of (at least) one of the plugs of the engine is connected to a first circuit for detecting the state of conductivity of the spark plug, such circuit comprising an adaptor stage 32, a generator of DC medium voltage 33, a filtering stage 34 and an amplifying stage 35.

The adaptor stage 32, inserted between two leads 31 and 51, serves to disconnect the circuit, and especially the generator 33, from the high-voltage main which reaches the electrode 19 of the plug 27. The generator 33 is capable of delivering current to the plug 27 via the leads 31 and 51 when, as detected through the same leads, the mixture which is present between the electrodes 19 and 23 is ionized and thus takes the properties of an electric conductor. The filtering stage 34 serves to isolate, from interferences of signals coming predominantly from the other plugs 28, 29 and 30, a signal 52 delivered thereto by the generator 33 when the latter generator is in the delivery condition. The amplifying stage 35 is intended to amplify the resultant filtered signal. Upstream of the contact-breaker 14 it is derived, through the lead 36, a second circuit for detecting the conditions of the contact-breaker, said circuit comprising an adaptor stage 37, a filtering stage 38 and a driving stage 39.

The adaptor stage 37 serves to disconnect the circuit of the low-voltage winding 12 of the coil 13 and for the manipulation as to shape and level of the low-voltage signal generated in the same circuit as the contact-breaker 14 opens, when a spark is generated between the electrodes of the spark plug which is sequentially selected by the distributor 18. The filtering stage 38 is intended to isolate said low-voltage signal from frequency-superposed signals due to the induction of the high-voltage winding 16 of the coil 13 on the low-voltage winding 12. The driving stage 39 serves to amplify the signal which is generated due to the effect of the low-voltage signal.

In the drawing, 40 indicates the switching stage which is connected by the line 41 to the amplification stage 35 of the first circuit, and is connected via the line 42 to the driving stage 39 of the second circuit.

The switching stage 40 receives via the line 41 the signal which is generated in the first circuit when the mixture between the electrodes 19 and 23 of the plug 27 is ionized. The switching stage 40, again, receives also, via the line 42, the signal which is generated in the second circuit when the contact breaker 14 opens.

The switching stage 40 allows the flow towards its output of the signal generated in the first circuit whenever in the line 42 the signal generated in the second circuit is not present. Such output signal of the switching stage 40 indicates the presence of ionization and thus of combustion of the mixture in the cylinder having the plug 27 before any sparking between the electrodes 19 and 23 of the same plug 27. This latter signal thus is an indication of premature ignition in the cylinder concerned.

The switching stage 40, conversely, cuts off the signal coming thereto via the line 41 when it receives, simultaneously, via the line 42, the signal generated in the second circuit, In such a case, actually, the ionization of the mixture which is present between the electrodes 19 and 23 of the plug 27 is due to the spark which occurs between the same electrodes due to the opening of the contact-breaker 14. If no signal is present at the output of the switching stage 40, this fact indicates that the ignition is positively regular as it is controlled by the appropriate phase sequence of the contact-breaker 14.

The pre-ignition signal at the output of the switching stage 40 is delivered to the detection stage 43 which shapes it in such a way as to be used subsequently. As a matter of fact, the detection stage is connected to a display stage 44 in which the pre-ignition stage is made visible for an onlooker. The detection stage might also be connected to an operative stage indicated at 45 and shown in phantom, wherein the signal is processed in order to be exploited in the advance regulator 46, also shown in phantom, which acts upon the contact-breaker 14 to modify the angle of advance so as to render the engine run regular.

The regulator is capable of controlling the advance also as a function of the pre-ignition parameter.

We claim:

1. A device for detecting the pre-ignition in an internal-combustion engine having a controlled ignition, which is connected to the ignition system of the same engine, said ignition system comprising circuit means for controlling cyclically the sparking at each plug of the engine with an ignition advance variable as a function of the working condition of the same engine, said device comprising first means operatively connected to at least one of the spark plugs of the engine adapted to generate signals indicative of the state of conduction of the same plug, that is of the ionization between its electrodes, the device being characterized in that it comprises second means operatively connected to said circuit means, adapted to detect the operative state of the same plug and adapted to generate signals indicative of the sparking at the plug, and further comprising switching means operatively connected to said first and second means, adapted to generate signals as a function of the signal delivered by said first means exclusively when no signals are generated by said second means.

2. Device according to claim 1, in which said first means are composed by at least a first circuit of detection of the state of conduction of one spark plug of the engine, said first circuit comprising a first adaptor stage for disconnecting the same circuit from said circuit means, a generator of medium DC voltage adapted to deliver current towards said plug when the mixture present between the plug electrodes is ionized and takes the character of an electric conductor, a filtering stage adapted to separate from interferences of spurious signals the current signals flowing therethrough when said generator is delivering current, a stage of amplification of said current signals, the device being characterized in that said second means are composed by a second circuit of detection of the operative state of the plug, said second circuit comprising also a second adaptor stage for disconnecting the same circuit from said circuit means and for the manipulation as to shape and as to level of the low-voltage signals which are generated in the same second circuit when sparking occurs between the plug electrodes, a filtering stage adapted to isolate said low-voltage signals from the frequency-superposed signals, a driving stage adapted to amplify the signals which are generated in the second circuit, said switching means comprising a switching stage connected to said first and said second circuits, said switching stage being adapted to permit the flow towards the output of the signals generated in the first circuit when no signals are delivered by the second circuit, the presence of said signals at the output of the switching stage being indicatve of the ionization of the mixture in the cylinder prior to lug sparking, thus pre-ignition, said switching stage being adapted to cut off the flow of signals generated in the first circuit in the presence of signals delivered by the second circuit, that is, in the presence of sparking at the plug, said switching stage being operatively connected to a stage of detection of the output signals of the switching stage.

3. A device according to claim 2, characterized in that it comprises a stage of display of the signal exiting the detection stage.

4. A device according to claim 2, characterized in that it comprises an operative stage adapted to process the output signal of the detection stage to send it to an ignition-advance regulator, said regulator being capable of controlling the angle of advance of the ignition as a function of the pre-ignition conditions.

* * * * *